US011343206B2

(12) United States Patent
Craig et al.

(10) Patent No.: US 11,343,206 B2
(45) Date of Patent: May 24, 2022

(54) REDUNDANT INFRASTRUCTURE FOR INDUSTRIAL AUTOMATION DISTRIBUTED CONTROL SYSTEMS

(71) Applicant: Rockwell Automation Technologies, Inc., Mayfield Heights, OH (US)

(72) Inventors: Armand J. Craig, Kent, OH (US); Eric Eilberg, Rocky River, OH (US); Stephen Wenner, Akron, OH (US); Timothy C. Mirth, Hudson, OH (US); Nicholas R. Garcias, Richmond Heights, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 176 days.

(21) Appl. No.: 16/892,950

(22) Filed: Jun. 4, 2020

(65) Prior Publication Data

US 2021/0152495 A1 May 20, 2021

Related U.S. Application Data

(60) Provisional application No. 62/936,224, filed on Nov. 15, 2019.

(51) Int. Cl.
*H04L 12/709* (2013.01)
*H04L 12/863* (2013.01)
(Continued)

(52) U.S. Cl.
CPC ...... *H04L 49/552* (2013.01); *G05B 19/41835* (2013.01); *G05B 19/41855* (2013.01);
(Continued)

(58) Field of Classification Search
CPC ... H04L 49/552; H04L 67/125; H04L 45/245; H04L 67/1002; H04L 41/22; H04L 43/08;
(Continued)

(56) References Cited

U.S. PATENT DOCUMENTS

7,480,725 B2 * 1/2009 Krajewski, III .. H04L 29/12047
709/229
2003/0204505 A1 * 10/2003 Cotner .................. G06F 16/284
(Continued)

*Primary Examiner* — Rebecca E Song
*Assistant Examiner* — Vanneilian Lalchinthang (57) ABSTRACT

To facilitate redundancy in a distributed control system architecture used in an industrial automation environment, a user workstation is connected to multiple enterprise access switches. Separate physical connections established between an application server and the enterprise access switches are configured into a single virtual interface for the application server to provide physical media redundancy between the application server and the enterprise access switches. Redundancy switches are connected to the enterprise access switches and to a first LAN and a second LAN, and are assigned unique IP addresses but communicate using a same default gateway IP address to serve as redundant default gateways. The redundancy switches are configured with a redundancy protocol that enables transmission of duplicate data packets over the first LAN and the second LAN. Redundant industrial controllers are connected to both the first LAN and the second LAN, wherein the redundant industrial controllers utilize non-swapping IP addresses.

20 Claims, 5 Drawing Sheets

(51) Int. Cl.
    *G06F 9/455*      (2018.01)
    *H04L 49/552*     (2022.01)
    *G05B 19/418*     (2006.01)
    *H04L 45/24*      (2022.01)
    *H04L 67/1001*    (2022.01)

(52) U.S. Cl.
    CPC ........ *H04L 45/245* (2013.01); *H04L 67/1002* (2013.01); *G05B 2219/31368* (2013.01)

(58) Field of Classification Search
    CPC . H04L 43/0817; H04L 69/14; H04L 61/2007; G05B 19/41835; G05B 19/41855; G05B 9/03; G05B 2219/31368; Y02D 30/50
    USPC ......................................................... 370/216
    See application file for complete search history.

(56)                    References Cited

U.S. PATENT DOCUMENTS

| | | | |
|---|---|---|---|
| 2012/0151057 A1* | 6/2012 | Paredes | H04L 12/4641 |
| | | | 709/225 |
| 2015/0124614 A1* | 5/2015 | Alizadeh Attar | H04L 61/6095 |
| | | | 370/235 |
| 2015/0227443 A1* | 8/2015 | Wu | G06F 11/2007 |
| | | | 714/5.1 |
| 2016/0299909 A1* | 10/2016 | Sreenivasamurthy | |
| | | | G06F 11/1469 |
| 2019/0075043 A1* | 3/2019 | Selvaraj | H04L 45/02 |
| 2020/0336418 A1* | 10/2020 | Jayaraj | H04L 45/22 |

\* cited by examiner

REDUNDANT INFRASTRUCTURE FOR INDUSTRIAL AUTOMATION DISTRIBUTED CONTROL SYSTEMS

RELATED APPLICATIONS

This application claims the benefit of, and priority to, U.S. Provisional Patent Application No. 62/936,224, entitled "REDUNDANT INFRASTRUCTURE FOR INDUSTRIAL AUTOMATION DISTRIBUTED CONTROL SYSTEMS", filed on Nov. 15, 2019, which is hereby incorporated by reference in its entirety for all purposes.

TECHNICAL FIELD

Aspects of the disclosure are related to computing hardware and software technology, and in particular to industrial automation applications.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines and other devices during the industrial manufacturing process. These machines typically have various moving parts and other components that are driven by instructions received from industrial controller systems and continually produce operational data over time, such as pressure, temperature, speed, and other metrics. Machine builders, solution providers, and other content creators typically produce the control logic needed to run on these controllers to control the machines.

In addition to controller logic, other content may be employed or generated during industrial automation operations, such as data sets, drive parameters, cam tables, product formulations, recipes, production data, and human-machine interface (HMI) components. An HMI receives and processes status data from the machines to generate various graphical displays. For example, an HMI graphical display might indicate status metrics of a drive, the pressure of a pump, the speed of a motor, or the output of a robot. The HMI may also provide a mechanism for an operator to send control instructions to an industrial controller system that controls a machine. For example, an operator might use the HMI to direct the control system to update drive parameters, turn on a pump, speed-up a motor, or stop a robot.

Overview

Techniques to facilitate redundancy in a distributed control system architecture used in an industrial automation environment are disclosed herein. In at least one implementation, at least one user workstation is connected to at least two enterprise access switches. Separate physical connections are established between at least one application server and the at least two enterprise access switches. The separate physical connections between the at least one application server and the at least two enterprise access switches are configured into a single virtual interface for the at least one application server to provide physical media redundancy between the at least one application server and the at least two enterprise access switches. At least two redundancy switches are connected to the at least two enterprise access switches and the at least two redundancy switches are connected to a first local area network (LAN) and a second LAN, wherein the at least two redundancy switches are assigned unique internet protocol (IP) addresses but are configured to communicate using a same default gateway IP address to serve as redundant default gateways. The at least two redundancy switches are configured with a redundancy protocol that enables transmission of duplicate data packets over the first LAN and the second LAN. At least two redundant industrial controllers are connected to both the first LAN and the second LAN, wherein the at least two redundant industrial controllers utilize non-swapping IP addresses.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

A distributed control system (DCS) provides process control in an industrial automation environment. In some examples, a DCS can enable plant-wide control and optimization of industrial processes, and may provide scalable and modular architectures. A DCS typically has several local industrial controllers located throughout the industrial automation environment that are connected over a communication network. While each controller functions separately to control industrial automation machinery and processes, a human operator often provides central supervisory control from an operator workstation. However, if any piece of hardware or software fails in a DCS, the operator may lose visibility and control over the system. Accordingly, the present disclosure identifies a redundant infrastructure configuration for distributed control systems used in industrial automation, which provides failure resiliency from software to hardware. An operator utilizing this network architecture, along with the specified software components, will be able to achieve a "no single point of failure" infrastructure that is able to ride through multiple hardware and software failures and still provide visibility to the operator interface. Network redundancy along with hardware and software redundancy is how this will be achieved to ensure "zero blind time" to the operator at the interface. In at least one implementation, one exemplary solution utilizes a combination of Stratix® hardware provided by Rockwell Automation, Inc., Cisco® network hardware, specific network protocols, and FactoryTalk® View software to achieve a fully redundant system. This redundant system can withstand faults and failures within either the network infrastructure or software without compromising the ability to operate a facility via the FactoryTalk® View software operator interface.

Figure 1:
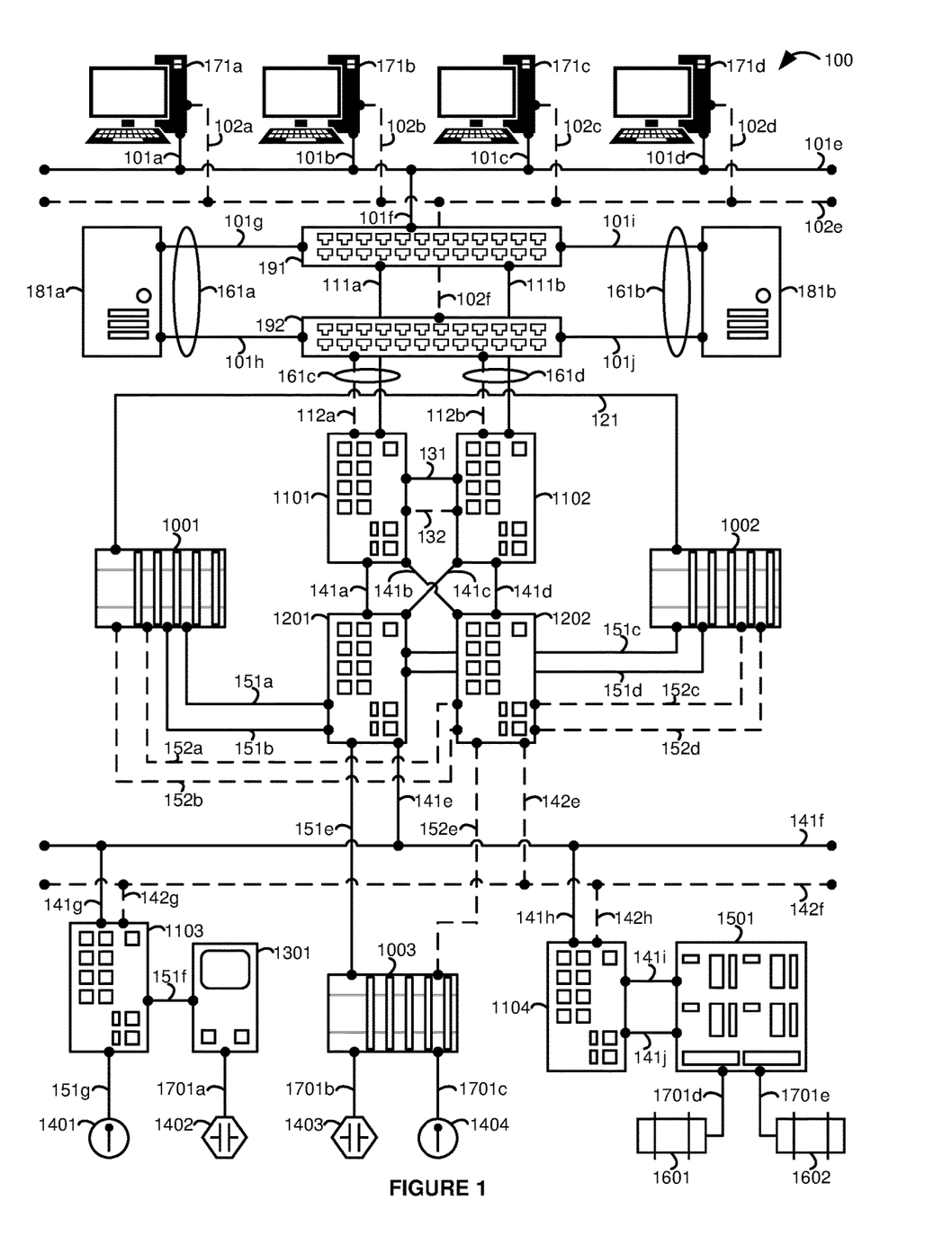
FIG. 1 is a block diagram that illustrates a communication system in an exemplary implementation.
Figure 2:
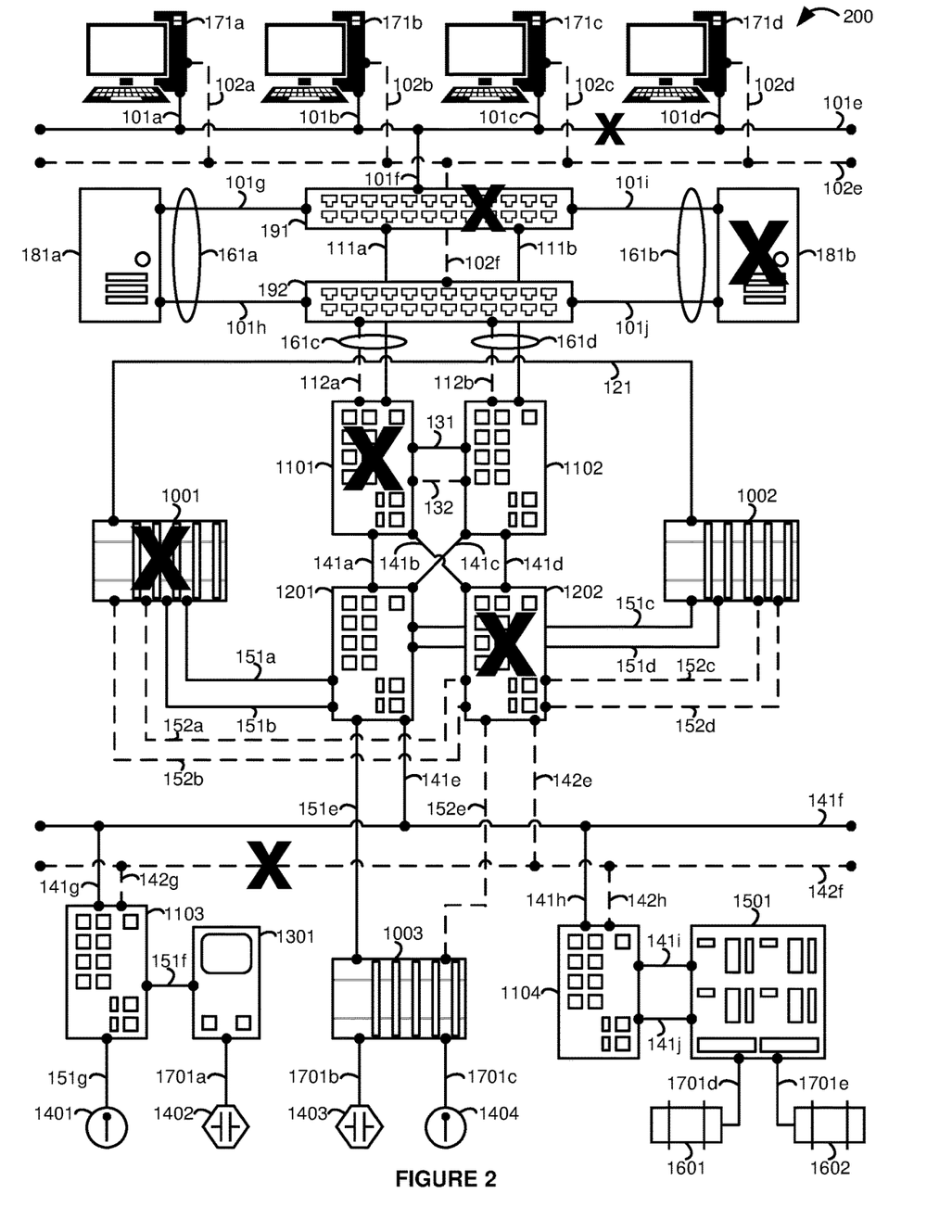
FIG. 2 is a block diagram that illustrates an operation of a communication system in an exemplary implementation.
Figure 3:
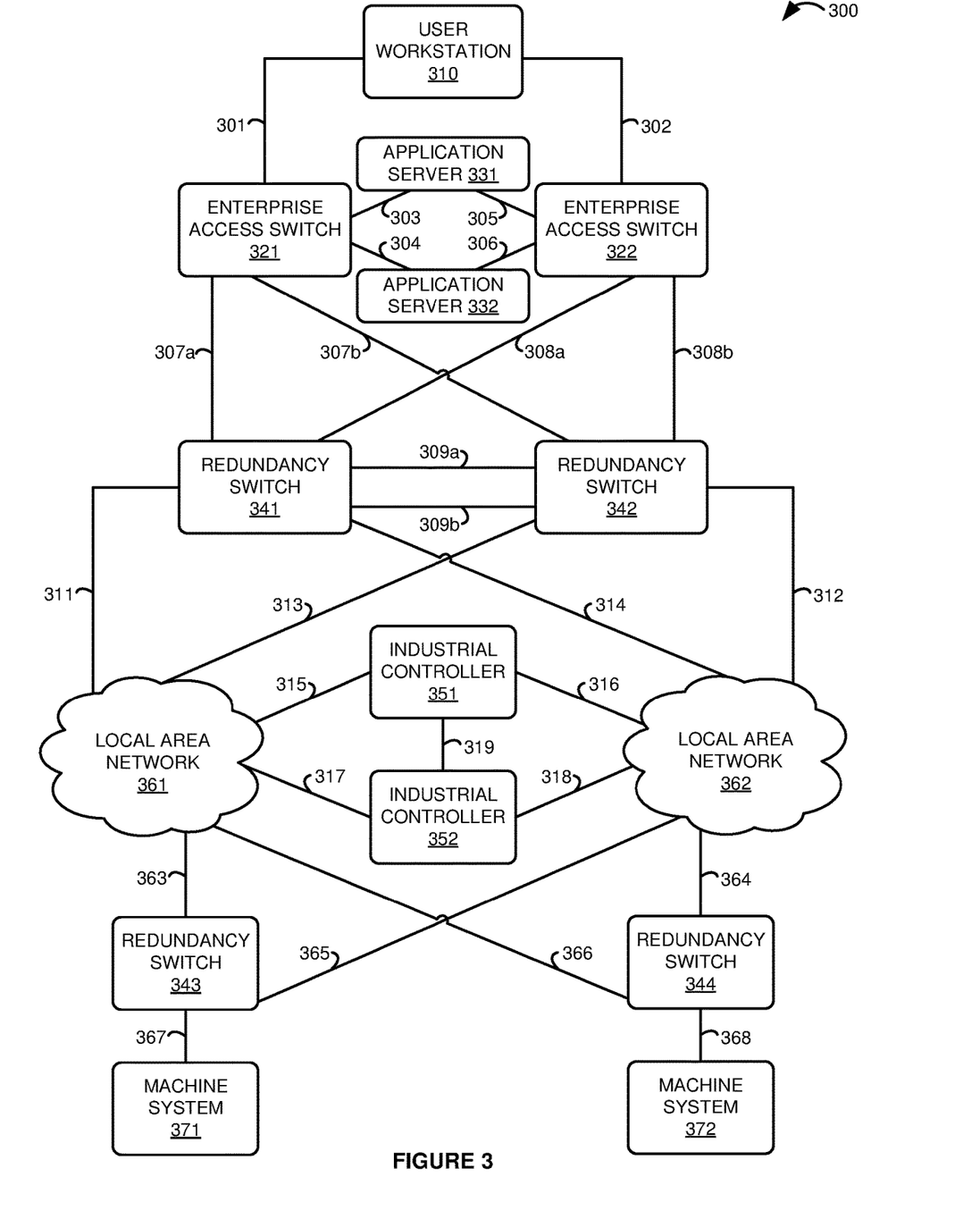
FIG. 3 is a block diagram that illustrates a communication system in an exemplary implementation.
Figure 4:
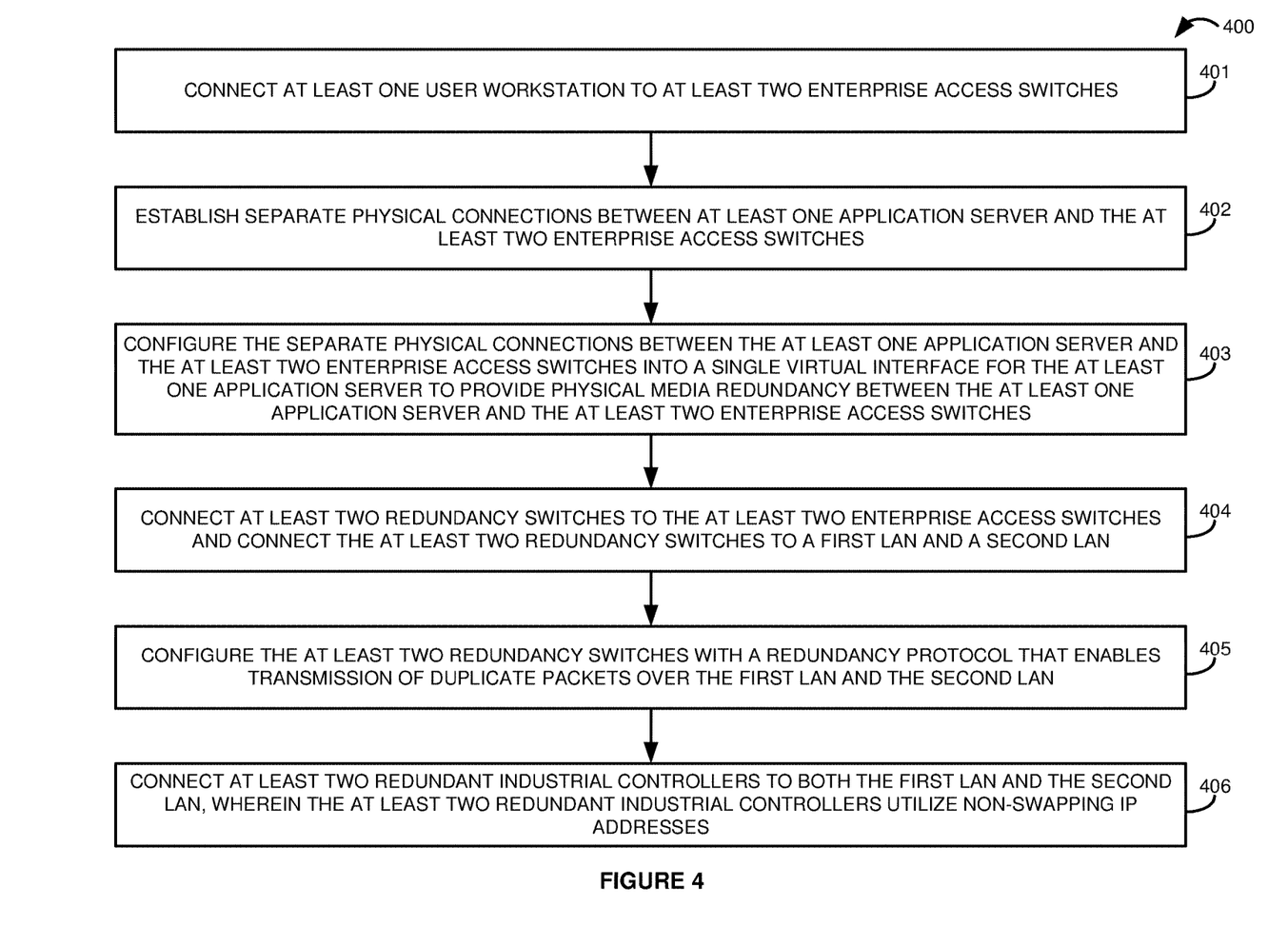
FIG. 4 is a flow diagram that illustrates an operation of a communication system in an exemplary implementation.
Figure 5:
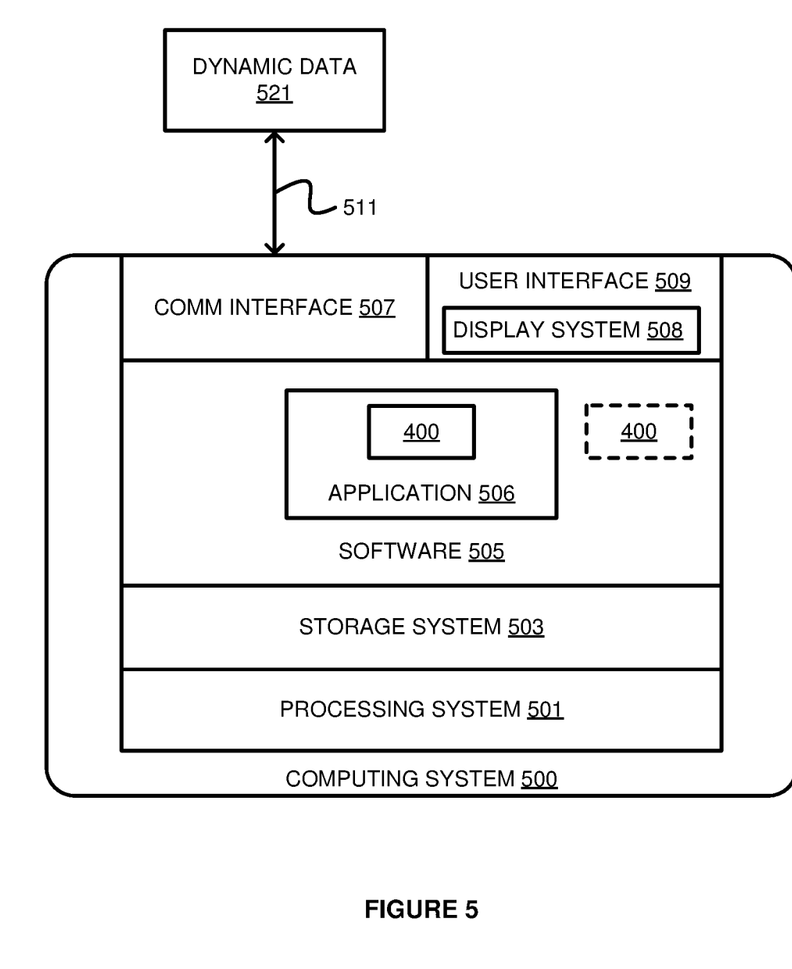
FIG. 5 is a block diagram that illustrates a computing system in an exemplary implementation.

Referring now to the drawings, FIG. 1 illustrates a communication system that provides a redundant infrastructure for a distributed control system used in an industrial automation environment in an exemplary implementation, while FIG. 2 illustrates failures of multiple components in an operation of the communication system. FIG. 3 illustrates another communication system that provides a redundant infrastructure for a distributed control system used in an industrial automation environment in an exemplary implementation. FIG. 4 illustrates a flow diagram of an operation to facilitate redundancy in a distributed control system architecture used in an industrial automation environment. FIG. 5 illustrates an exemplary computing system that may be used to perform any of the redundancy processes and operational scenarios described herein.

Turning now to FIG. 1, a communication system 100 of an industrial automation environment is illustrated. Communication system 100 provides an example of a DCS that may be used to implement a redundancy process to facilitate redundancy in a distributed control system architecture used in an industrial automation environment as described herein. Communication system 100 provides an example of one possible implementation of a redundant architecture that may be employed in a DCS, but note that other implementations could employ different architectures with additional and/or alternative components. In this example, communication system 100 includes operator and engineering workstations 171a, 171b, 171c, and 171d, application servers 181a and 181b, enterprise access switches 191 and 192, Redundancy Box (RedBox) switches 1101, 1102, 1103, and 1104, redundant industrial controller chassis 1001 and 1002, and redundant local area network (LAN) access switches 1201 and 1202. Communication system 100 also includes industrial controller 1003, meter 1301, sensors 1401, 1402, 1403, and 1404, motor control center 1501, and motors 1601 and 1602. In some examples, communication system 100 could comprise a PlantPAx® DCS provided by Rockwell Automation, Inc. The techniques described below with respect to FIG. 1 could be combined with operation 400 of FIG. 4 in some implementations.

The redundant architecture illustrated in FIG. 1 is intended to solve the problem of no single points of failure in any part of the infrastructure, therefore being able to withstand a failure and display no noticeable effects at the human-machine interface (HMI) as an operator is working at a workstation. Accordingly, throughout the entire architecture the system can withstand failures within controllers, switches, stack members, physical communication links, software, and any other components and still ride through and provide the ability to the operator to continue to operate the plant without any indication that a failure occurred.

Working through the architecture from the top down, each operator workstation 171a-171d shown at the top is connected to two separated Ethernet links 101e and 102e down to each enterprise access switch 191 and 192. In some implementations, enterprise access switches 191 and 192 may comprise Cisco® enterprise stack members, such as Cisco® 9300 switches, but any suitable enterprise access switches could be used. Each workstation 171a, 171b, 171c, and 171d is shown connected over respective primary connections 101a, 101b, 101c, and 101d to a primary enterprise access switch 191 via communication link 101e and primary switch 191 connection 101f. Similarly, each workstation 171a, 171b, 171c, and 171d is connected over respective secondary connections 102a, 102b, 102c, and 102d to a secondary enterprise access switch 192 via communication link 102e and secondary switch 192 connection 102f. In at least one implementation, communication links 101e and 102e could comprise Ethernet links, but other communication links are also possible, including wireless connections. In this example, the primary connections 101a-101f and secondary connections 102a-102f between the operator workstations 171a-171d and the enterprise switch stack members 191 and 192 could comprise a supervisory network virtual local area network (VLAN), but other network architectures are also possible.

Application servers 181a and 181b typically run multiple software components, which may be instantiated on virtual machines managed by a hypervisor running on application servers 181a and 181b in some examples. In at least one implementation, application servers 181a and 181b could have software products provided by Rockwell Automation, Inc., including PlantPAx® virtualized templates that provide the HMI software, which could comprise the FactoryTalk® View product in this example, along with the FactoryTalk® Linx software which effectively provides a gateway to connect the HMI components, workstation clients, historian database, and other applications to the redundant controllers, machines and other industrial devices below.

Application servers 181a and 181b are attached to each of the enterprise access switches 191 and 192. Specifically, application server 181a is connected to primary enterprise switch 191 over link 101g and connected to secondary enterprise switch 192 over link 101h. Likewise, application server 181b is connected to primary enterprise switch 191 over link 101i and connected to secondary enterprise switch 192 over link 101j. These connections 101g-101j between the servers 181a and 181b and the enterprise stack switches 191 and 192 are also part of the supervisory network VLAN in this example. Each application server 181a and 181b has a physical connection 101g-101j to each of the enterprise switches 191 and 192, which provides two separate connections from each server to the stack of enterprise switches, effectively providing physical media redundancy between the application servers and the enterprise switches. In this implementation, the enterprise access switch stack members 191 and 192 utilize an Etherchannel configuration and link aggregation control protocol (LACP) on the connections 101g-101j with the virtualized environment of the application servers 181a and 181b. In this example, the ring 161a encircling the connections 101g and 101h designates the Etherchannel link aggregation of application server 181a, and the ring 161b encircling the connections 101i and 101j designates the Etherchannel link aggregation of application server 181b. The application servers 181a and 181b have the ability to team network interface cards (NICs) which combines two physical interfaces on a server into one virtual interface using LACP. The Etherchannel configuration provides load balancing but also a failover, where the failure of either link will not cause a failure because communications can continue to ride on the other cable. Moreover, by utilizing the Etherchannel and LACP connections, one member of the enterprise switch stack 191 or 192 can fail and the other one can continue to run without any ill effects.

Below the enterprise access switch stack members 191 and 192, two redundancy box (RedBox) switches 1101 and 1102 are illustrated. The RedBox switches 1101 and 1102 in this example could be exemplified by Stratix® 5400 or 5410 switches provided by Rockwell Automation, Inc., but any suitable redundancy switches could also be used. RedBox switches 1101 and 1102 may utilize parallel redundancy protocol (PRP) technology or any other redundancy protocol to achieve a redundant network infrastructure. In this example, the RedBox switches 1101 and 1102 are connected to the enterprise switch stack members 191 and 192 over layer 3 routed point-to-point connections 111a, 111b, 112a, and 112b. In at least one implementation, the layer 3 routing could utilize Cisco® Enhanced Interior Gateway Routing Protocol (EIGRP) IP services protocol, which uses routed point-to-point connections between each enterprise stack member 191 and 192 and the redundant RedBox switches 1101 and 1102, but any other suitable routing protocol could also be used. In this example, the routed point-to-point connections are also Etherchannel so either one can fail and the signal can still ride through, as indicated by the ring 161c encircling connections 111a and 112a and the ring 161d encircling connections 111b and 112b, which designates the Etherchannel link aggregation of these connections.

As discussed above, the RedBox switches 1101 and 1102 may utilize PRP technology in this example, creating a fully redundant network infrastructure for the layer 2 control network. In this example, the RedBox switches 1101 and 1102 are connected to each other over layer 3 routed point-to-point connections 131 and 132, and PRP may be implemented through the layer 2 PRP network. The RedBox switches 1101 and 1102 may also utilize a feature called Hot Standby Router Protocol (HSRP), which may be implemented by communication links 141a, 141b, 141c, and 141d between the RedBox switches 1101 and 1102 to authenticate. By utilizing HSRP, the two RedBox switches 1101 and 1102 are aware of each other and both have unique IP addresses assigned to them that are subsequent to the virtual IP of a default gateway that they are configured to mimic. Essentially, HSRP provides the ability to have one RedBox switch take over and become the virtualized switch if the other one fails, effectively creating redundant default gateways for the control network shown below. The RedBox taking over will assume the virtual MAC address and IP address and become the default gateway for all the information being transmitted between the enterprise access switch stacks 191 and 192 and the controllers 1001 and 1102 and other industrial devices below. For example, assuming the default gateway IP address is 192.168.1.1, RedBox 1101 is configured with 192.168.1.2, and RedBox 1102 is assigned 192.168.1.3, each of the two RedBoxes 1101 and 1102 can mimic the 192.168.1.1 default gateway IP address. Accordingly, when the 192.168.1.2 RedBox 1101 is acting as the 192.168.1.1 virtualized gateway and RedBox 1101 fails, the 192.168.1.3 RedBox 1102 then becomes the 192.168.1.1 default gateway, thereby providing a virtual redundancy. The two redundant RedBox switches 1101 and 1102 share the gateway IP address and use a gratuitous Address Resolution Protocol (ARP) to notify the network of which RedBox is actually communicating over the gateway IP address, which is defined by the HSRP that is being used between the two RedBox switches.

As discussed above, in this example the two RedBox switches 1101 and 1102 in the center form the HSRP pair and enable the PRP channel and extend down to LAN 141f and LAN 142f. The PRP technology provides the ability to send the same packets on both LAN 141f and LAN 142f which are separated and isolated. Each LAN 141f and 142f lead back to another set of RedBox switches 1103 and 1104 below that interpret both of the packets received from each RedBox 1101 and 1102 above and discard the secondary copy once a valid packet is received. The LAN switch components 1201 and 1202 represent multiple switches and connections to several network components, including connections to the RedBox switches 1101 and 1102 and redundant controller chassis racks 1001 and 1002. The LAN switch components 1201 and 1202 are redundant in that component 1201 can completely fail and the traffic can still have its path from the end device to the gateway through the other LAN component 1202, and vice versa. The communication links 141a, 141b, 141c, and 141d between the RedBox switches 1101 and 1102 and the LAN switch components 1201 and 1202 comprise native VLAN trunk links in this example. LAN 141f and 142f also comprise native VLAN trunk connections, so any components connected to LAN 141f and 142f are also connected over native VLAN trunk links. Accordingly, the connection 141e from LAN switch 1201 to LAN 141f and connection 142e from LAN switch 1202 to LAN 142f comprise native VLAN trunk links, along with links 141g and 142g of RedBox 1103 and links 141h and 142h of RedBox 1104. Further, the links 141i and 141j between RedBox 1104 and motor control center 1501 comprise native VLAN trunk links as well.

The redundant industrial controller racks 1001 and 1002 in this example comprise ControlLogix® controller chassis provided by Rockwell Automation, Inc., but any other suitable industrial control systems could be used. In some examples, the redundant controller chassis 1001 and 1002 may include 1756-EN2TP Parallel Redundancy Protocol modules, which could comprise the PRP modules in this example. Additionally or alternatively, controller chassis 1001 and 1002 may include 1756-EN4TR ControlLogix® modules, which may also support PRP in some examples. Effectively, the redundant controller racks 1001 and 1002 utilizing such redundancy modules are capable of interpreting and processing the duplicative packets sent over the LANs 141f and 142f by the RedBox switches 1101-1104. The communication link 121 between the controller chassis racks 1001 and 1002 indicates a ControlLogix® redundancy module provided by a 1756-RM2 module in this example, although other industrial controller redundancy modules could also be used. Further, each of the redundant controller racks 1001 and 1002 are connected to both LAN switch components 1201 and 1202, so that if any of the wires are cut or the switches fail on one or the other, the data will still be transmitted. Specifically, controller 1001 and primary LAN access switch 1201 are in communication over primary communication links 151a and 151b, and controller 1002 and primary LAN switch 1201 communicate over links 151c and 151d, which comprise control network VLAN connections in this example. Likewise, controller 1001 and secondary LAN access switch 1202 are in communication over secondary communication links 152a and 152b, while controller 1002 and secondary LAN switch 1202 communicate over links 152*c* and 152*d*, which also comprise control network VLAN links in this example.

Each of the redundant controller chassis 1001 and 1002 also utilize non-swapping IP addresses in this example, which may be implemented in firmware. By not swapping the IP addresses, the HMI application from the operator workstations 171*a*-171*d* and the FactoryTalk® Linx or other gateway components are able to monitor two different, unique IP addresses assigned to each of the redundant controller racks 1001 and 1002. Accordingly, when the primary redundant controller rack 1001 fails, the secondary rack 1002 immediately continues on over its own IP connection, and no visible downtime occurs at the operator's HMI, whereas previously the controller racks 1001 and 1002 were utilizing swapping IP addresses and there was a downtime when the secondary rack 1002 had to pick up that primary address.

In the control network shown in the bottom section of the redundant architecture, other industrial devices and additional RedBox switches 1103 and 1104 are shown. In particular, the RedBox 1104 on the bottom right is connected to motor control center 1501 over native VLAN trunk links 141*i* and 141*j*. Motor control center 1501 functions to control the two motors 1601 and 1602 over respective links 1701*d* and 1701*e*. In the bottom middle, an industrial controller 1003 is connected to sensor 1403 over link 1701*b* and temperature sensor 1404 over link 1701*c*. In some implementations, industrial controller 1003 could comprise one or more programmable logic controller (PLC) blades in a controller chassis rack. Industrial controller 1003 is connected to LAN switch 1201 over primary link 151*e* and connected to LAN switch 1202 over secondary link 152*e*, which both comprise control network VLAN links in this example.

RedBox 1103 on the bottom left is connected to temperature sensor 1401 over link 151*g* and meter 1301 over link 151*f*, both of which comprise control network VLAN links. In this example, the additional RedBox switches 1103 and 1104 are configured to enable virtual double attached node (VDAN) support for end devices without PRP technology to still connect to both LAN 141*f* and LAN 142*f* through the RedBox 1103. A VDAN has PRP redundancy and appears to other nodes in the network as a double attached node (DAN), which is an end device with PRP technology that connects to both LAN 141*f* and LAN 142*f* on its own. Effectively, a device that does not support PRP can still achieve PRP through the VDAN provided by the RedBox 1103, and then that RedBox 1103 in the control network will duplicate those packets across LAN 141*f* and LAN 142*f*, up to the RedBox 1101 or 1102 that is currently acting as the virtual gateway to the layer 3 routed point-to-point connection to the enterprise switch stacks 191 and 192 and beyond.

Advantageously, the present architecture removes the single points of failure that may be present in distributed control systems to achieve a fully redundant system. By employing the architecture and techniques disclosed herein, the system is able to handle a failure and not drop communications or lose visual control at the operator workstations. To achieve these results, specific configurations are made to the base firmware of several network components, including switches, controllers, and communication modules, which are then combined using multiple redundant connections and protocols. In particular, a fully redundant system is achieved by implementation of PRP across the entire DCS architecture through the employment of redundant enterprise switch stack members, redundant RedBox switches, redundant LANs, and non-swapping IP addresses at the EN2TP PRP modules within the redundant ControlLogix® racks. In this manner, a redundant infrastructure configuration for distributed control systems used in industrial automation is achieved, which provides failure resiliency from software to hardware. An operation of this communication system that describes its ability to withstand multiple points of failure along the communication path will now be discussed with respect to FIG. 2.

FIG. 2 illustrates failures of multiple components in an operation of communication system 200. Communication system 200 comprises the identical industrial automation environment of communication system 100 of FIG. 1. The large X marks appearing over various components and connections within communication system 200 represent faults or failures of these network elements. In particular, an X is shown to designate failures on primary Ethernet link 101*e*, enterprise switch stack member 191, application server 181*b*, RedBox switch 1101, industrial controller chassis 1001, LAN component 1202, and secondary LAN connection 142*f*. Accordingly, since secondary LAN connection 142*f* and LAN switch 1202 are down, status metrics and other data from sensors 1401-1404 and motors 1601 and 1602 would still be transmitted via primary LAN 141*f* and LAN access switch 1201. Further, although industrial controller rack 1001 has failed, the redundancy provided by controller 1002 and the redundancy module 121 enable PRP for these controller racks 1001 and 1002, and allow the signal to ride through to the RedBox switches 1101 and 1102 via LAN switch 1201.

In this example, the primary RedBox switch 1101 has also failed, as indicated by the X mark appearing on RedBox 1101. However, because the RedBox switches 1101 and 1102 utilize HSRP, when the primary RedBox switch 1101 fails, the secondary RedBox 1102 immediately takes over and assumes the virtual IP address of the default gateway for all the information being transmitted between the enterprise access switch stacks 191 and 192 and the controller racks 1001 and 1002 and other industrial devices below.

HSRP provides the ability to have one RedBox switch take over and become the virtualized switch if the other one fails, effectively creating redundant default gateways for the control network below. The RedBox taking over will assume the virtual MAC address and IP address and become the default gateway for all the information being transmitted between the enterprise access switch stacks 191 and 192 and the controllers 1001 and 1002 and other industrial devices below. Accordingly, RedBox 1102 receives the data packets and forwards them up to the enterprise switch stacks 191 and 192. As discussed above, because the RedBox switches 1101 and 1102 are connected to the enterprise switch stacks 191 and 192 over layer 3 routed point-to-point connections with an Etherchannel link aggregation configuration, either one can fail and the signal can still ride through.

Upon receipt of the data packets at the enterprise switch stacks 191 and 192 transmitted from RedBox 1102 acting as the default gateway, enterprise switch 192 handles the processing because enterprise switch 191 is down. Further, since application server 181*b* is also currently down, application server 181*a* is utilized to provide the virtualized templates and other software applications necessary to format and deliver the data to the user workstations 171*a*-171*d*. By utilizing an Etherchannel configuration with LACP, enterprise switch 192 is able to continue run and communicate with application server 181*a* without any downtime, despite the failure of enterprise switch 191. The still-functional enterprise switch stack member 192 then delivers the data packets up to the user workstations 171a-171d via secondary Ethernet link 102e over respective workstation links 102a-102d. In this manner, despite the multiple system-wide component failures, the user workstations 171a-171d are still able to receive data from the sensors 1401-1404 and motors 1601 and 1602 in the control network below, and can still transmit data requests and instructions down to these devices via the same path and redundant components that are still functioning. Another communication system that provides a redundant infrastructure for a distributed control system used in an industrial automation environment will now be described with respect to FIG. 3.

Turning now to FIG. 3, a communication system 300 of an industrial automation environment is illustrated. Communication system 300 provides an example of a DCS that may be used to implement a redundancy process to facilitate redundancy in a distributed control system architecture used in an industrial automation environment as described herein. Communication system 300 provides an example of one possible implementation of a redundant architecture that may be employed in a DCS, but note that other implementations could employ different architectures with additional and/or alternative components. In this example, communication system 300 includes user workstation 310, enterprise access switches 321 and 322, application servers 331 and 332, redundancy switches 341, 342, 343, and 344, industrial controllers 351 and 352, local area networks (LANs) 361 and 362, and machine systems 371 and 372. In some examples, communication system 300 could comprise a PlantPAx® DCS provided by Rockwell Automation, Inc. An operation that may be employed to facilitate redundancy in a distributed control system architecture used in an industrial automation environment will now be described with respect to FIG. 4.

FIG. 4 is a flow diagram that illustrates an operation 400 in an exemplary implementation. The operation 400 shown in FIG. 4 may also be referred to as redundancy process 400 herein. The steps of the operation are indicated below parenthetically. The following discussion of operation 400 may proceed with reference to elements of FIG. 3 in order to illustrate its operations, but note that the details provided in FIG. 3 are merely exemplary and not intended to limit the scope of process 400 to the specific implementation shown in FIG. 3. Operation 400 may also be combined with the techniques described above with respect to FIGS. 1 and 2 in some implementations.

Operation 400 may be employed to facilitate redundancy in a distributed control system architecture used in an industrial automation environment. As shown in the operational flow of process 400, at least one user workstation 310 is connected to at least two enterprise access switches 321 and 322 (401). In at least one implementation, the at least one user workstation 310 is connected to a first enterprise access switch 321 over a primary connection 301 and connected to a second enterprise access switch 322 over a secondary connection 302. Some examples of the at least one user workstation 310 could comprise a computing system configured to operate a human-machine interface (HMI) system, and/or receive virtualized software from an application server 331 or 332 running DCS virtualized templates, such as the FactoryTalk® View and FactoryTalk® Linx products provided by Rockwell Automation, Inc. Some examples of the enterprise access switches 321 and 322 could comprise Cisco® switch stack members, such as Cisco® 9300 enterprise switches.

Separate physical connections 303-306 are established between at least one application server 331 and 332 and the at least two enterprise access switches 321 and 322 (402). In at least one implementation, two or more application servers 331 and 332 could be utilized for complete redundancy. The at least one application server 331 and 332 could comprise any computing system capable of operating as an application server as described herein. In some examples, the at least one application server 331 and 332 could comprise a computing system running DCS virtualized templates, such as PlantPAx® virtualized templates that provide HMI software such as FactoryTalk® View and connection software such as FactoryTalk® Linx provided by Rockwell Automation, Inc. In at least one implementation, establishing the separate physical connections 303-306 between the at least one application server 331 and 332 and the at least two enterprise access switches 321 and 322 could comprise establishing a first set of the separate physical connections 303 and 305 between a first application server 331 and the at least two enterprise access switches 321 and 322 and establishing a second set of the separate physical connections 304 and 306 between a second application server 332 and the at least two enterprise access switches 321 and 322.

The separate physical connections 303-306 between the at least one application server 331 and 332 and the at least two enterprise access switches 321 and 322 are configured into a single virtual interface for the at least one application server 331 and 332 to provide physical media redundancy between the at least one application server 331 and 332 and the at least two enterprise access switches 321 and 322 (403). As discussed above, each application server 331 and 332 has a physical connection 303-306 to each of the at least two enterprise access switches 321 and 322, which provides two separate connections from each server 331 and 332 to each of the enterprise access switches 321 and 322, effectively providing physical media redundancy between the application servers 331 and 332 and the at least two enterprise access switches 321 and 322. In at least one implementation, configuring the separate physical connections 303-306 between the at least one application server 331 and 332 and the at least two enterprise access switches 321 and 322 into the single virtual interface for the at least one application server 331 and 332 could comprise configuring the first set of the separate physical connections 303 and 305 between the first application server 331 and the at least two enterprise access switches 321 and 322 into a first single virtual interface for the first application server 331, and configuring the second set of the separate physical connections 304 and 306 between the second application server 332 and the at least two enterprise access switches 321 and 322 into a second single virtual interface for the second application server 332. In some implementations, the separate physical connections 303 and 305 between the at least one application server 331 and the at least two enterprise access switches 321 and 322 could be configured into a single virtual interface for the at least one application server 331 through various link aggregation technologies, such as an Etherchannel configuration and link aggregation control protocol (LACP). For example, in at least one implementation, configuring the separate physical connections 303 and 305 between the at least one application server 331 and the at least two enterprise access switches 321 and 322 into the single virtual interface for the at least one application server 331 may comprise configuring the separate physical connections 303 and 305 between the at least one application server 331 and the at least two enterprise access switches 321 and 322 into the single virtual interface using an Etherchannel configuration, LACP, or any other link aggregation protocol or configuration. Moreover, by utilizing Etherchannel and LACP connections, one of the at least two enterprise access switches 321 and 322 can fail and the other one can continue to run without impacting the experience of an operator working on a user workstation 310. Note that other protocols may be utilized to configure the separate physical connections 303 and 305 between the at least one application server 331 and the at least two enterprise access switches 321 and 322 into a single virtual interface for the at least one application server 331 to provide physical media redundancy between the at least one application server 331 and the at least two enterprise access switches 321 and 322 and are within the scope of this disclosure.

At least two redundancy switches 341 and 342 are connected to the at least two enterprise access switches 321 and 322 and the at least two redundancy switches 341 and 342 are connected to a first local area network (LAN) 361 and a second LAN 362 (404). In some examples, the at least two redundancy switches 341 and 342 could comprise Redundancy Box (RedBox) PRP switches, exemplified by Stratix® 5400 or 5410 switches provided by Rockwell Automation, Inc., but any suitable switch hardware and redundancy protocol could also be used. In at least one implementation, the at least two redundancy switches 341 and 342 may each be connected to a first enterprise access switch 321 over respective primary connections 307a and 307b, and connected to a second enterprise access switch 322 over respective secondary connections 308a and 308b. Further, the at least two redundancy switches 341 and 342 may each be connected to the first LAN 361 over respective primary connections 311 and 313, and connected to the second LAN 362 over respective secondary connections 312 and 314. In some implementations, the at least two redundancy switches 341 and 342 are assigned unique IP addresses but are configured to communicate using a same default gateway IP address to serve as redundant default gateways. For example, in at least one implementation, the at least two redundancy switches 341 and 342 could be configured to utilize a standby protocol, such as HSRP, to communicate using the same default gateway IP address to serve as redundant default gateways. For example, HSRP could provide the ability to have one of the redundancy switches 342 take over and become the default gateway if the other redundancy switch 341 fails, effectively creating redundant default gateways for the control network. The redundancy switch 342 taking over will assume a virtual MAC address and IP address and become the default gateway for all the information being transmitted between the at least two enterprise access switches 321 and 322 and the industrial controllers 351 and 352 and other devices below. Note that other protocols may be utilized to configure the at least two redundancy switches 341 and 342 to communicate using the same default gateway IP address and are within the scope of this disclosure.

The at least two redundancy switches 341 and 342 are configured with a redundancy protocol that enables transmission of duplicate data packets over the first LAN 361 and the second LAN 362 (405). In at least one implementation, the at least two redundancy switches 341 and 342 may be configured with a redundancy protocol that enables transmission of duplicate data packets over the first LAN 361 and the second LAN 362 by configuring the at least two redundancy switches 341 and 342 using parallel redundancy protocol (PRP) to enable the transmission of duplicate data packets over the first LAN 361 and the second LAN 362. In some implementations, the redundancy protocol could also be utilized to connect industrial devices without the redundancy protocol to the first LAN 361 and the second LAN 362 through one or more of the redundancy switches 341-344. For example, in at least one implementation, the redundancy switches 341-344 may be configured to enable VDAN support for end devices without PRP technology to still connect to both the first LAN 361 and the second LAN 362 through one of the redundancy switches 341-344. Note that other protocols may be utilized to configure the at least two redundancy switches 341 and 342 with a redundancy protocol that enables transmission of duplicate data packets over the first LAN 361 and the second LAN 362 and are within the scope of this disclosure.

At least two redundant industrial controllers 351 and 352 are connected to both the first LAN 361 and the second LAN 362, wherein the at least two redundant industrial controllers 351 and 352 utilize non-swapping IP addresses (406). In some examples, the least two redundant industrial controllers 351 and 352 could comprise automation controllers, programmable logic controllers (PLC s), programmable automation controllers (PACs), a controller rack chassis, and/or specific modules within a controller rack, any of which could provide some or all of the functionality described herein for the at least two redundant industrial controllers 351 and 352. In at least one implementation, the at least two redundant industrial controllers 351 and 352 could comprise ControlLogix® control systems provided by Rockwell Automation, Inc, but any other suitable industrial control systems could also be used. In some implementations, the at least two redundant industrial controllers 351 and 352 may each be connected to the first LAN 361 over respective primary connections 315 and 317, and connected to the second LAN 362 over respective secondary connections 316 and 318. In this example, each of the redundant industrial controllers 351 and 352 utilize non-swapping IP addresses, which may be implemented in firmware in some implementations. By not swapping the IP addresses, a gateway application executing on the application servers 331 and 332 can monitor two different, unique IP addresses assigned to each of the redundant industrial controllers 351 and 352. Accordingly, when the primary redundant industrial controller 351 fails, the secondary redundant industrial controller 352 immediately continues on over its own IP connection, and the redundant application servers 331 and 332 are able to provide the information to user workstation 310 with no visible downtime for the user.

Beneficially, the techniques disclosed herein identify a redundant infrastructure configuration for distributed control systems used in industrial automation, which provides failure resiliency of both software and hardware. By utilizing this network architecture, along with the specified software components, an operator can achieve a failsafe, redundant infrastructure capable of withstanding multiple hardware and software failures while continuously providing uninterrupted visibility and control to the operator interface. Accordingly, this redundant system can endure faults and failures within either the network infrastructure or software without compromising the ability to operate a facility via an HMI software operator interface executing on a user workstation 310.

Now referring back to FIG. 3, user workstation 310 is connected to enterprise access switch 321 over communication link 301, and connected to enterprise access switch 322 over communication link 302. Application server 331 is connected to enterprise access switch 321 over link 303, and connected to enterprise access switch 322 over link 305. In some implementations, these links 303 and 305 may be aggregated using link aggregation technologies such as Etherchannel, LACP, and others. Likewise, application server 332 is connected to enterprise access switch 321 over link 304, and connected to enterprise access switch 322 over link 306. In some implementations, these links 304 and 306 may also be aggregated using link aggregation technologies such as Etherchannel and LACP. Redundancy switch 341 is connected to enterprise access switch 321 over link 307a, and connected to enterprise access switch 322 over link 308a. In some implementations, these links 307a and 308a could comprise layer 3 routed point-to-point connections, and may be aggregated using link aggregation technologies such as Etherchannel, LACP, and others. Likewise, redundancy switch 342 is connected to enterprise access switch 321 over link 307b, and connected to enterprise access switch 322 over link 308b. In some implementations, these links 307b and 308b could comprise layer 3 routed point-to-point connections, and may also be aggregated using link aggregation technologies such as Etherchannel and LACP in some examples. Redundancy switches 341 and 342 are also linked together over layer 3 routed point-to-point primary connection 309a and secondary connection 309b. Redundancy switches 341 and 342 may utilize HSRP or some other redundant routing protocol in some examples.

Redundancy switch 341 is connected to LAN 361 over link 311, and connected to LAN 362 over link 314. Likewise, redundancy switch 342 is connected to LAN 361 over link 313, and connected to LAN 362 over link 312. Industrial controller 351 is connected to LAN 361 over link 315, and connected to LAN 362 over link 316. Similarly, industrial controller 352 is connected to LAN 361 over link 317, and connected to LAN 362 over link 318. Industrial controllers 351 and 352 are also linked together over link 319, which could comprise an industrial controller redundancy module such as a ControlLogix® redundancy module provided by a 1756-RM2 module in some examples.

Redundancy switch 343 is connected to LAN 361 over link 363, and connected to LAN 362 over link 365. Similarly, redundancy switch 344 is connected to LAN 361 over link 366, and connected to LAN 362 over link 364. Redundancy switch 343 and machine system 371 communicate over link 367, while redundancy switch 344 and machine system 372 are in communication over link 368. In some examples, machine systems 371 and 372 could comprise end devices that do not support a redundancy protocol such as PRP. Accordingly, in some implementations redundancy switches 343 and 344 could be configured to enable VDAN support for machine systems 371 and 372, so that machine systems 371 and 372 can still connect through both LAN 361 and LAN 362 through their respective redundancy switches 343 and 344. In at least one implementation, redundancy switches 343 and 344 may also be configured to receive and interpret duplicative packets received from the redundancy switches 341 and 342 above and discard the secondary copy once a valid packet is received. Likewise, redundancy switches 341 and 342 may also be configured to receive and interpret duplicative packets received from the redundancy switches 343 and 344 below and discard the secondary copy once a valid packet is received.

Communication system 300 provides an example of a communication system employed in an industrial automation environment, such as an industrial mining operation, automobile manufacturing factory, food processing plant, oil drilling operation, microprocessor fabrication facility, or some other type of industrial enterprise. In some examples, machine systems 371 and 372 could comprise sensors, meters, indicators, drives, pumps, filters, drills, motors, robots, mills, printers, fabrication machinery, or any other industrial automation equipment, including their associated control systems. A control system comprises, for example, industrial controllers 351 and 352, which could include automation controllers, programmable logic controllers (PLCs), programmable automation controllers (PACs), industrial controller chassis, controller racks, specific modules within a controller rack, or any other controllers used in automation control. Additionally, machine systems 371 and 372 could comprise other industrial equipment, such as a brew kettle in a brewery, a reserve of coal or other resources, or any other element that may reside in an industrial automation environment associated with communication system 300.

Machine systems 371 and 372 continually produce operational data over time. The operational data indicates the current status of machine systems 371 and 372, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine systems 371 and 372 are capable of transferring the operational data to user workstation 310 over the communication links and communication network components of communication system 300 as described herein, and to receive data requests and control instructions transmitted from user workstation 310 in some implementations.

Communication system 300 may be representative of any computing apparatus, system, or systems on which the redundancy processes disclosed herein or variations thereof may be suitably implemented. User workstation 310 provides an example of a computing system that could be used as a either a server or a client device in some implementations, although such devices could have alternative configurations. Examples of user workstation 310 include mobile computing devices, such as cell phones, tablets, laptops, and notebook computers, as well as any other type of mobile computing devices and any combination or variation thereof. Examples of user workstation 310 also include desktop computers, server computers, and virtual machines, as well as any other type of computing system, variation, or combination thereof. In some implementations, user workstation 310 could comprise a mobile device capable of operating in a server-like fashion which, among other uses, could be utilized in a wireless mesh network.

Turning now to FIG. 5, a block diagram is shown that illustrates computing system 500 in an exemplary implementation. Computing system 500 provides an example of any computing system or systems that may be used to execute redundancy process 400 or variations thereof, although such systems could use alternative configurations in other implementations. In some examples, computing system 500 could comprise some or all of the network components shown in communication system 300, including user workstation 310, enterprise access switches 321 and 322, application servers 331 and 332, redundancy switches 341, 342, 343, and 344, industrial controllers 351 and 352, LANs 361 and 362, and machine systems 371 and 372. Computing system 500 includes processing system 501, storage system 503, software 505, communication interface 507, and user interface 509. User interface 509 comprises display system 508. Software 505 includes application 506 which itself includes redundancy process 400. Redundancy process 400 may optionally be implemented separately from application 506, as indicated by the dashed line in FIG. 5.

Computing system 500 may be representative of any computing apparatus, system, or systems on which application 506 and redundancy process 400 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for redundancy process 400 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer-readable storage media capable of storing software 505 and readable by processing system 501. Storage system 503 may include volatile and nonvolatile, removable and non-removable media implemented in any method or technology for storage of information, such as computer readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 509, processing system 501 may load and execute portions of software 505, such as redundancy process 400, to function as shown and described herein, and equivalents thereof. Software 505 may be implemented in program instructions and among other functions may, when executed by computing system 500 in general or processing system 501 in particular, direct computing system 500 or processing system 501 to connect at least one user workstation to at least two enterprise access switches. Software 505 may further direct computing system 500 or processing system 501 to establish separate physical connections between at least one application server and the at least two enterprise access switches. Software 505 may direct computing system 500 or processing system 501 to configure the separate physical connections between the at least one application server and the at least two enterprise access switches into a single virtual interface for the at least one application server to provide physical media redundancy between the at least one application server and the at least two enterprise access switches. Software 505 may also direct computing system 500 or processing system 501 to connect at least two redundancy switches to the at least two enterprise access switches and connect the at least two redundancy switches to a first LAN and a second LAN. Software 505 may further direct computing system 500 or processing system 501 to assign unique IP addresses to the at least two redundancy switches but configure the at least two redundancy switches to communicate using a same default gateway IP address to serve as redundant default gateways. Software 505 may also direct computing system 500 or processing system 501 to configure the at least two redundancy switches with a redundancy protocol that enables transmission of duplicate data packets over the first LAN and the second LAN. Finally, software 505 may direct computing system 500 or processing system 501 to connect at least two redundant industrial controllers to both the first LAN and the second LAN, wherein the at least two redundant industrial controllers utilize non-swapping IP addresses.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate redundancy in a distributed control system architecture used in an industrial automation environment as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage.

In some examples, if the computer-storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506 and/or redundancy process 400 (and variations thereof). However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the internet to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as display system 508, speakers, haptic devices, and other types of output devices may also be included in user interface 509. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface. User interface 509 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate redundancy in a distributed control system architecture used in an industrial automation environment, the method comprising:
   connecting at least one user workstation to at least two enterprise access switches;
   establishing separate physical connections between at least one application server and the at least two enterprise access switches;
   configuring the separate physical connections between the at least one application server and the at least two enterprise access switches into a single virtual interface for the at least one application server to provide physical media redundancy between the at least one application server and the at least two enterprise access switches;
   connecting at least two redundancy switches to the at least two enterprise access switches and connecting the at least two redundancy switches to a first local area network (LAN) and a second LAN, wherein the at least two redundancy switches are assigned unique internet protocol (IP) addresses but are configured to communicate using a same default gateway IP address to serve as redundant default gateways;
   configuring the at least two redundancy switches with a redundancy protocol that enables transmission of duplicate data packets over the first LAN and the second LAN; and
   connecting at least two redundant industrial controllers to both the first LAN and the second LAN, wherein the at least two redundant industrial controllers utilize non-swapping IP addresses.

2. The method of claim 1 wherein connecting the at least one user workstation to the at least two enterprise access switches comprises connecting the at least one user workstation to a first enterprise access switch over a primary connection and connecting the at least one user workstation to a second enterprise access switch over a secondary connection.

3. The method of claim 1 wherein establishing the separate physical connections between the at least one application server and the at least two enterprise access switches comprises establishing a first set of the separate physical connections between a first application server and the at least two enterprise access switches and establishing a second set of the separate physical connections between a second application server and the at least two enterprise access switches.

4. The method of claim 3 wherein configuring the separate physical connections between the at least one application server and the at least two enterprise access switches into the single virtual interface for the at least one application server comprises configuring the first set of the separate physical connections between the first application server and the at least two enterprise access switches into a first single virtual interface for the first application server, and configuring the second set of the separate physical connections between the second application server and the at least two enterprise access switches into a second single virtual interface for the second application server.

5. The method of claim 1 wherein configuring the separate physical connections between the at least one application server and the at least two enterprise access switches into the single virtual interface for the at least one application server comprises configuring the separate physical connections between the at least one application server and the at least two enterprise access switches into the single virtual interface using link aggregation control protocol (LACP).

6. The method of claim 1 wherein the at least two redundancy switches are configured to utilize hot standby router protocol (HSRP) to communicate using the same default gateway IP address to serve as the redundant default gateways.

7. The method of claim 1 wherein configuring the at least two redundancy switches with the redundancy protocol that enables transmission of duplicate data packets over the first LAN and the second LAN comprises configuring the at least two redundancy switches using parallel redundancy protocol (PRP) to enable the transmission of duplicate data packets over the first LAN and the second LAN.

8. A communication system to facilitate redundancy in a distributed control system architecture used in an industrial automation environment, the communication system comprising:
   at least one user workstation, at least two enterprise access switches, at least one application server, at least two redundancy switches, a first local area network (LAN), a second LAN, and at least two redundant industrial controllers;
   the at least one user workstation connected to the at least two enterprise access switches;
   separate physical connections established between the at least one application server and the at least two enterprise access switches, wherein the separate physical connections between the at least one application server and the at least two enterprise access switches are configured into a single virtual interface for the at least one application server to provide physical media redundancy between the at least one application server and the at least two enterprise access switches;
   the at least two redundancy switches connected to the at least two enterprise access switches and the at least two redundancy switches connected to the first LAN and the second LAN, wherein the at least two redundancy switches are assigned unique internet protocol (IP) addresses but are configured to communicate using a same default gateway IP address to serve as redundant default gateways;
   the at least two redundancy switches configured with a redundancy protocol that enables transmission of duplicate data packets over the first LAN and the second LAN; and
   the at least two redundant industrial controllers connected to both the first LAN and the second LAN, wherein the at least two redundant industrial controllers utilize non-swapping IP addresses.

9. The communication system of claim 8 wherein the at least one user workstation connected to the at least two enterprise access switches comprises the at least one user workstation connected to a first enterprise access switch over a primary connection and the at least one user workstation connected to a second enterprise access switch over a secondary connection.

10. The communication system of claim 8 wherein the separate physical connections established between the at least one application server and the at least two enterprise access switches comprises a first set of the separate physical connections established between a first application server and the at least two enterprise access switches and a second set of the separate physical connections established between a second application server and the at least two enterprise access switches.

11. The communication system of claim 10 wherein the separate physical connections between the at least one application server and the at least two enterprise access switches are configured into the single virtual interface for the at least one application server by configuring the first set of the separate physical connections between the first application server and the at least two enterprise access switches into a first single virtual interface for the first application server, and configuring the second set of the separate physical connections between the second application server and the at least two enterprise access switches into a second single virtual interface for the second application server.

12. The communication system of claim 8 wherein the separate physical connections between the at least one application server and the at least two enterprise access switches are configured into the single virtual interface for the at least one application server by configuring the separate physical connections between the at least one application server and the at least two enterprise access switches into the single virtual interface using link aggregation control protocol (LACP).

13. The communication system of claim 8 wherein the at least two redundancy switches are configured to utilize hot standby router protocol (HSRP) to communicate using the same default gateway IP address to serve as the redundant default gateways.

14. The communication system of claim 8 wherein the at least two redundancy switches configured with the redundancy protocol that enables transmission of duplicate data packets over the first LAN and the second LAN comprises the at least two redundancy switches configured using parallel redundancy protocol (PRP) to enable the transmission of duplicate data packets over the first LAN and the second LAN.

15. One or more computer-readable storage media having program instructions stored thereon to facilitate redundancy in a distributed control system architecture used in an industrial automation environment, wherein the program instructions, when executed by one or more processors, direct the one or more processors to at least:
   connect at least one user workstation to at least two enterprise access switches;
   establish separate physical connections between at least one application server and the at least two enterprise access switches;
   configure the separate physical connections between the at least one application server and the at least two enterprise access switches into a single virtual interface for the at least one application server to provide physical media redundancy between the at least one application server and the at least two enterprise access switches;
   connect at least two redundancy switches to the at least two enterprise access switches and connect the at least two redundancy switches to a first local area network (LAN) and a second LAN;
   assign unique internet protocol (IP) addresses to the at least two redundancy switches but configure the at least two redundancy switches to communicate using a same default gateway IP address to serve as redundant default gateways;

configure the at least two redundancy switches with a redundancy protocol that enables transmission of duplicate data packets over the first LAN and the second LAN; and connect at least two redundant industrial controllers to both the first LAN and the second LAN, wherein the at least two redundant industrial controllers utilize non-swapping IP addresses.

16. The one or more computer-readable storage media of claim 15 wherein the program instructions direct the one or more processors to connect the at least one user workstation to the at least two enterprise access switches by directing the one or more processors to connect the at least one user workstation to a first enterprise access switch over a primary connection and connect the at least one user workstation to a second enterprise access switch over a secondary connection.

17. The one or more computer-readable storage media of claim 15 wherein the program instructions direct the one or more processors to establish the separate physical connections between the at least one application server and the at least two enterprise access switches by directing the one or more processors to establish a first set of the separate physical connections between a first application server and the at least two enterprise access switches and establish a second set of the separate physical connections between a second application server and the at least two enterprise access switches.

18. The one or more computer-readable storage media of claim 17 wherein the program instructions direct the one or more processors to configure the separate physical connections between the at least one application server and the at least two enterprise access switches into the single virtual interface for the at least one application server by directing the one or more processors to configure the first set of the separate physical connections between the first application server and the at least two enterprise access switches into a first single virtual interface for the first application server, and configure the second set of the separate physical connections between the second application server and the at least two enterprise access switches into a second single virtual interface for the second application server.

19. The one or more computer-readable storage media of claim 15 wherein the program instructions direct the one or more processors to configure the separate physical connections between the at least one application server and the at least two enterprise access switches into the single virtual interface for the at least one application server by directing the one or more processors to configure the separate physical connections between the at least one application server and the at least two enterprise access switches into the single virtual interface using link aggregation control protocol (LACP).

20. The one or more computer-readable storage media of claim 15 wherein the program instructions direct the one or more processors to configure the at least two redundancy switches to communicate using the same default gateway IP address by directing the one or more processors to configure the at least two redundancy switches to utilize hot standby router protocol (HSRP) to communicate using the same default gateway IP address to serve as the redundant default gateways.

* * * * *